(12) United States Patent
Ellström et al.

(10) Patent No.: US 7,909,261 B2
(45) Date of Patent: Mar. 22, 2011

(54) DEVICE AND AN AIRCRAFT ANTI-ICING SYSTEM COMPRISING SUCH A DEVICE

(75) Inventors: Hans Ellström, Linköping (SE); Mats Bergman, Mjölby (SE)

(73) Assignee: SAAB AB, Linköping (SE)

( * ) Notice: Subject to any disclaimer, the term of this patent is extended or adjusted under 35 U.S.C. 154(b) by 401 days.

(21) Appl. No.: 11/424,544

(22) Filed: Jun. 16, 2006

(65) Prior Publication Data

US 2007/0084969 A1      Apr. 19, 2007

(30) Foreign Application Priority Data

Jul. 1, 2005   (EP) .................................... 05106008

(51) Int. Cl.
*G05D 23/185* (2006.01)
(52) U.S. Cl. ............... 236/12.11; 236/12.16; 236/12.17; 244/134 R
(58) Field of Classification Search ............... 244/134 R, 244/134 C; 137/893; 236/12.11, 12.12, 236/12.6, 12.17; 60/39.093; 239/135
See application file for complete search history.

(56) References Cited

U.S. PATENT DOCUMENTS

| | | | | |
|---|---|---|---|---|
| 2,507,621 A | * | 5/1950 | Branson | 236/12.11 |
| 2,803,408 A | * | 8/1957 | Hope | 236/12.14 |
| 2,844,320 A | * | 7/1958 | Cate | 236/12.12 |
| 3,561,478 A | * | 2/1971 | Taplin | 137/625.4 |
| 3,727,837 A | * | 4/1973 | Gazzera et al. | 236/87 |
| 3,749,336 A | | 7/1973 | Christensen et al. | |
| 3,980,229 A | * | 9/1976 | Stedman et al. | 236/12.11 |
| 3,981,466 A | * | 9/1976 | Shah | 244/134 R |
| 4,019,678 A | * | 4/1977 | Lord | 236/12.11 |
| 4,041,695 A | * | 8/1977 | Harper et al. | 60/779 |
| 4,757,963 A | | 7/1988 | Cole et al. | |
| 4,775,117 A | | 10/1988 | Standke et al. | |
| 5,511,723 A | * | 4/1996 | Eki et al. | 236/12.12 |
| 2006/0108435 A1 | * | 5/2006 | Kozdras et al. | 236/93 R |

* cited by examiner

*Primary Examiner* — Tien Dinh
*Assistant Examiner* — Philip J Bonzell
(74) *Attorney, Agent, or Firm* — Venable LLP; Eric J. Franklin

(57) ABSTRACT

A device including a primary fluid inlet, a secondary fluid inlet, a mixing chamber connected to the primary fluid inlet via en ejector nozzle and to the secondary fluid inlet, a fluid outlet connected to the mixing chamber for outflow of gas from the mixing a chamber, a valve arrangement having a valve member arranged to influence the secondary fluid inlet so as to adjust the amount of gas entering the mixing chamber from the secondary fluid inlet and a a temperature-dependent regulator connected to the valve arrangement for controlling the position of the valve member and thereby the amount of gas entering the mixing chamber from the secondary fluid inlet in dependence upon the temperature of the gas flowing through the primary fluid inlet or the fluid outlet. An aircraft anti-icing system including such a device and the use thereof.

16 Claims, 2 Drawing Sheets

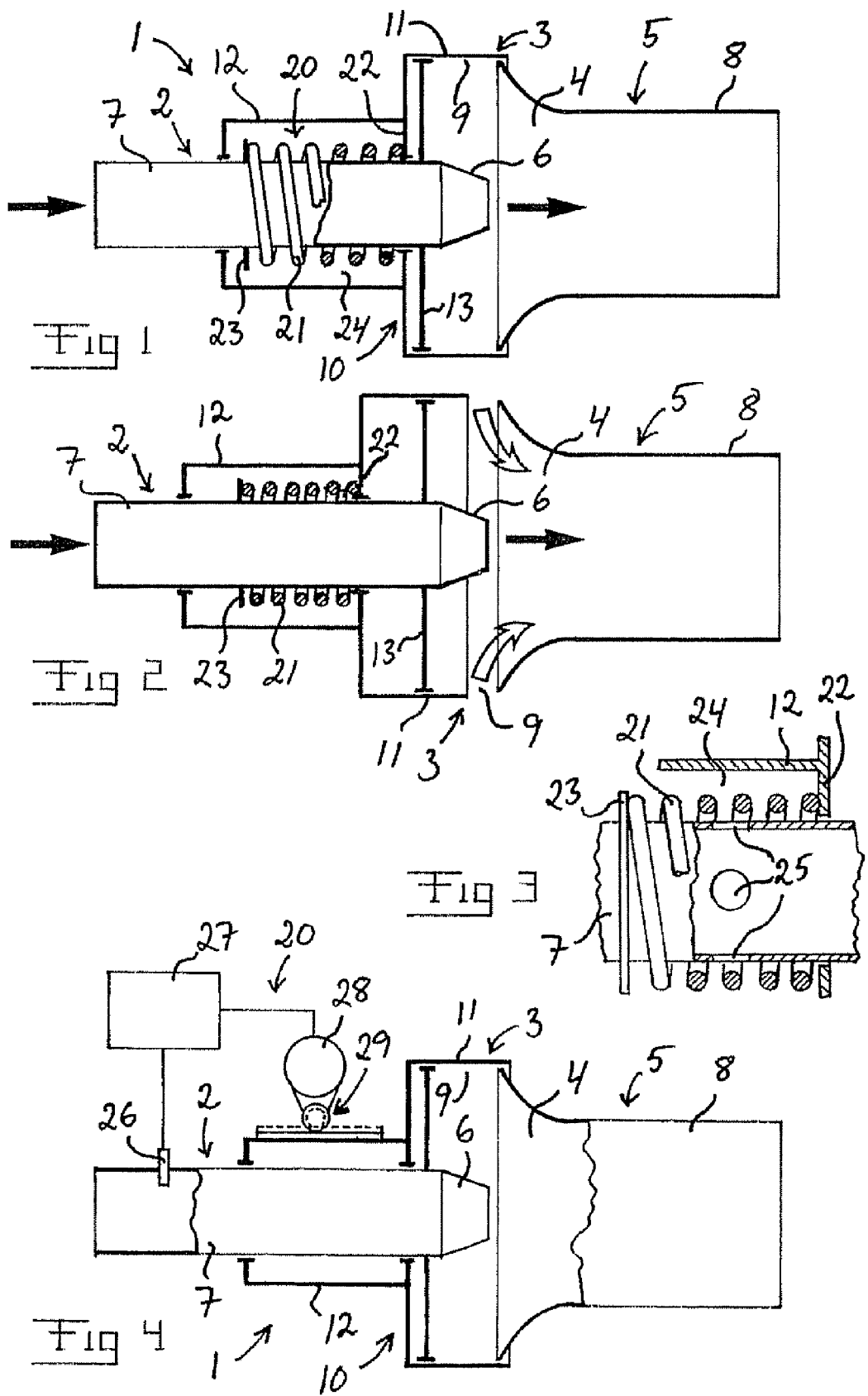

DEVICE AND AN AIRCRAFT ANTI-ICING SYSTEM COMPRISING SUCH A DEVICE

FIELD OF THE INVENTION AND PRIOR ART

The present invention relates to a device, preferably for use in an aircraft anti-icing system, and an aircraft anti-icing system comprising such a device. The invention also relates to the use of the device for avoiding an excessively high temperature of the pressurized hot gas distributed in an aircraft anti-icing system from an aircraft engine to a part of the aircraft to be protected from icing by virtue of the heat of the pressurized hot gas.

An aircraft engine is provided with an air intake appliance designed to receive ambient air and direct the air towards the aircraft engine, i.e. an appliance designed to supply the aircraft engine with the required intake air. The air intake appliance is provided with an air intake channel for guiding the intake air towards the aircraft engine. This channel is at its upstream end provided with an inlet turned towards the flying direction of the associated aircraft so as to efficiently bring ambient air to flow into the channel. Supercooled water may follow the intake air into the channel via the inlet and impinge upon the walls of the channel during flight. The air intake appliance is normally provided with means for heating the channel walls so as to vaporize supercooled water that impinges upon the channel walls and thereby prevent such supercooled water from forming ice that may follow the intake air into the engine and cause damages to the engine.

One frequently used technique for achieving the required heating of a channel wall of an air intake appliance for an aircraft engine is to conduct pressurized hot air from the compressor of the aircraft engine through one or several ducts arranged inside the channel wall. The hot air will heat the channel wall and the heat will be conducted through the wall so as to produce the desired vaporization of supercooled water that impinges upon the wall. The temperature of the pressurized hot air drawn off from the compressor of the aircraft engine can be very high during certain operating conditions, which will cause locally very high temperatures in the channel wall. These high wall temperatures will often imply that it is impossible to construct the channel wall of aluminum, since aluminium is a material sensitive to the high temperatures that may occur. Therefore, the channel wall is normally made of steel or titanium, which are materials that are heavier and more costly than aluminium. This will consequently make the air intake appliance relatively costly and heavy.

In order to overcome the above-indicated problem of very high channel wall temperatures in an air intake appliance for an aircraft engine it is suggested in U.S. Pat. No. 6,443,395 B1 to mix the pressurized hot air from the compressor of the engine with air that is circulating in an annular chamber in the air intake appliance. The solution according to U.S. Pat. No. 6,443,395 B1 is adapted for an air inlet cowl of a jet engine and is not adapted for use with other types of air intake appliances, e.g. an air intake appliance for a propeller engine, or for use with other parts of an aircraft to be protected from icing.

OBJECT OF THE INVENTION

The object of the present invention is to make possible an alternative solution to the above-indicated problem of very high wall temperatures in a part of an aircraft to be protected from icing by pressurized hot gas, which solution is efficient and applicable to various types of aircraft parts.

SUMMARY OF THE INVENTION

According to the invention, said object is achieved by means of a device which comprises:
- a primary fluid inlet to be connected to a source of pressurized hot gas;
- a secondary fluid inlet to be connected to a source of gas having a lower temperature than said pressurized hot gas;
- a mixing chamber connected to the primary fluid inlet and to the secondary fluid inlet so as to allow inflow of gas into the mixing chamber from said fluid inlets;
- a fluid outlet connected to the mixing chamber for outflow of gas from the mixing chamber;
- an ejector nozzle for introducing gas from the primary fluid inlet into the mixing chamber, the ejector nozzle being designed to allow gas from the secondary fluid inlet to be drawn into the mixing chamber by virtue of the ejector effect caused by pressurized hot gas entering the mixing chamber from the primary fluid inlet through the ejector nozzle;
- a valve arrangement having a valve member arranged to influence the secondary fluid inlet so as to adjust the amount of gas entering the mixing chamber from the secondary fluid inlet; and
- a temperature-dependent regulating means connected to the valve arrangement for controlling the position of the valve member and thereby the amount of gas entering the mixing chamber from the secondary fluid inlet in dependence upon the temperature of the pressurized hot gas flowing through the primary fluid inlet or the temperature of the gas flowing through the fluid outlet.

With the device according to the invention, it will be possible to mix the pressurized hot gas flowing through the primary fluid inlet with cooler gas from the secondary fluid inlet when the temperature of the pressurized hot gas reaches a too high temperature so as to thereby reduce the temperature of the gas leaving the device through the fluid outlet. Hereby, it will be possible to avoid an excessively high temperature level of the pressurized gas downstream of the device. By including a device according to the invention in a conduit arranged to lead pressurized hot gas from an aircraft engine towards a part of an aircraft to be protected from icing, the above-indicated problem of excessively high wall temperatures in the ice-protected aircraft part may be avoided or at least alleviated. By a suitable adaptation of the inventive device it will be possible to reduce the maximum temperature in the walls of the ice-protected aircraft part to such an extent that the walls can be made of aluminum instead of steel or titanium, which consequently will reduce the costs and the weight of the ice-protected aircraft part.

According to an embodiment of the invention, the regulating means comprises a regulating element, preferably of bimetallic material, which is connected to the valve arrangement and arranged to be influenced by the temperature of the pressurized hot gas flowing through the primary fluid inlet or the temperature of the gas flowing through the fluid outlet so as to control the position of the valve member by changing shape in dependence upon said temperature. Hereby, the position of the valve member and thereby the amount of gas entering the mixing chamber through the secondary fluid inlet will be automatically controlled in dependence upon said temperature without requiring any electric or electronic components, which implies a high reliability in service.

The invention also relates to an aircraft anti-icing system comprising a conduit to be connected to an aircraft engine, preferably to a compressor of the aircraft engine, in order to lead pressurized hot gas from the aircraft engine towards a part of an aircraft to be protected from icing by virtue of the heat of the pressurized hot gas, wherein the anti-icing system comprises an inventive device arranged in said conduit, the primary fluid inlet being arranged to receive pressurized hot gas from the aircraft engine and the fluid outlet being arranged to direct gas from the mixing chamber towards said aircraft part.

The invention also relates to the use of an inventive device for avoiding an excessively high temperature of the pressurized hot gas distributed in an aircraft anti-icing system from an aircraft engine to a part of the aircraft to be protected from icing by virtue of the heat of the pressurized hot gas. The regulating means of the device is to keep the valve member in a position obstructing the secondary fluid inlet as long as the temperature of the pressurized hot gas flowing through the primary fluid inlet or the temperature of the gas flowing through the fluid outlet is below a predetermined limit temperature and make the valve member assume a position allowing fluid flow through the secondary fluid inlet when said temperature exceeds the predetermined limit temperature.

BRIEF DESCRIPTION OF THE DRAWINGS

The invention will in the following be more closely described by means of embodiment examples, with reference to the appended drawings, where:

FIG. 1 is a schematical, partially cut lateral view of a device according to a first embodiment of the present invention, with the valve member of the device shown in closed position, FIG. 2 shows the device according to FIG. 1 with the valve member of the device shown in open position, FIG. 3 is a schematical, partially cut lateral view of a part of a device according to a second embodiment of the invention, FIG. 4 is a schematical, partially cut lateral view of a device according to a third embodiment of the invention.

DETAILED DESCRIPTION OF PREFERRED EMBODIMENTS OF THE INVENTION

Figure 5:
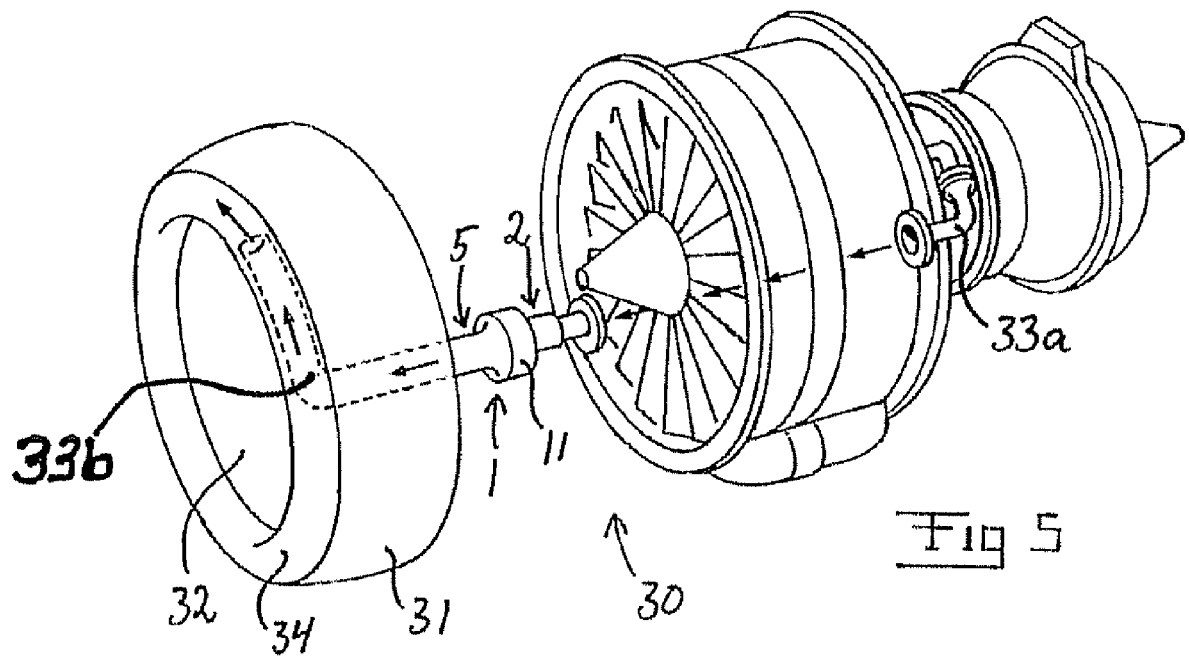
FIG. 5 is a schematical, exploded perspective view of an aircraft jet engine provided with an anti-icing system comprising a device according to the invention.

FIGS. 1-4 schematically show different embodiments of a device 1 according to the present invention. The device 1 is particularly intended to be used in an aircraft anti-icing system, as will be more closely described below. The device 1 comprises i.a.:

- a primary fluid inlet 2 to be connected to a source of pressurized hot gas so as to receive pressurized hot gas from this source;
- a secondary fluid inlet 3 to be connected to a source of gas having a lower temperature than said pressurized hot gas so as to receive gas from this source;
- a mixing chamber 4 connected to the primary fluid inlet 2 and to the secondary fluid inlet 3 so as to allow inflow of gas into the mixing chamber from said fluid inlets 2, 3; and
- a fluid outlet 5 connected to the mixing chamber 4 for outflow of gas from the mixing chamber.

The mixing chamber 4 is arranged to receive gas from the fluid inlets 2, 3. Gas entering the mixing chamber 4 from the secondary fluid inlet 3 is in the mixing chamber 4 mixed with gas entering the mixing chamber from the primary fluid inlet 2, whereupon the mixed gas leaves the mixing chamber 4 via the fluid outlet 5. The mixing chamber 4 is preferably rotationally symmetrical.

The device 1 further comprises an ejector nozzle 6 for introducing gas from the primary fluid inlet 2 into the mixing chamber 4. The ejector nozzle 6 is designed to allow gas from the secondary fluid inlet 3 to be drawn into the mixing chamber 4 by virtue of the ejector effect caused by pressurized hot gas entering the mixing chamber from the primary fluid inlet 2 through the ejector nozzle 6, i.e. the flow of pressurized hot gas into the mixing chamber 4 via the ejector nozzle 6 is able to draw gas from the secondary fluid inlet 3 into the mixing chamber. Thus, the cooler gas to be introduced into the mixing chamber via the secondary fluid inlet 3 does not have to be pressurized. The primary fluid inlet 2 comprises a pipe 7 for directing pressurized hot gas into the ejector nozzle 6 and the fluid outlet 5 comprises a pipe 8 for leading gas away from the mixing chamber 4. It is realized that the fluid outlet pipe 8 should have an internal cross-sectional area that is larger than the internal cross-sectional area of the primary fluid inlet pipe 7.

The device 1 further comprises a valve arrangement 10 having a valve member 11 arranged to influence the secondary fluid inlet 3 so as to adjust the amount of gas entering the mixing chamber 4 from the secondary fluid inlet 3, and a temperature-dependent regulating means 20 connected to the valve arrangement 10 for controlling the position of the valve member 11 and thereby the amount of gas entering the mixing chamber 4 from the secondary fluid inlet 3 in dependence upon the temperature of the pressurized hot gas flowing through the primary fluid inlet 2 or the temperature of the gas flowing through the fluid outlet 5. The valve member 11 is moveable between open position (see FIG. 2), in which the valve member allows fluid flow through the secondary fluid inlet 3, and closed position (see FIGS. 1 and 3), in which the valve member obstructs the secondary fluid inlet 3. When in closed position, the valve member 11 completely or at least essentially closes the secondary fluid inlet 3 so that gas flow into the mixing chamber 4 through the secondary fluid inlet is prevented or at least essentially prevented.

The regulating means 20 is arranged to keep the valve member 11 in closed position as long as the temperature of the pressurized hot gas flowing through the primary fluid inlet 2 or the temperature of the gas flowing through the fluid outlet 5 is below a predetermined limit temperature and to make the valve member 11 assume open position when said temperature exceeds the predetermined limit temperature. Thus, the inflow of gas into the mixing chamber 4 from the secondary fluid inlet 3 is obstructed as long as said temperature is below the predetermined limit temperature.

The valve member 11 is preferably cylindrically shaped and axially displaceable to and fro between closed and open position, as illustrated in FIGS. 1, 2 and 4. The valve member 11 is preferably rotationally symmetrical. In the illustrated embodiments, the cylindrically shaped valve member 11 is coaxial with the ejector nozzle 6 and extends about it. When the valve member 11 is cylindrically shaped, the secondary fluid inlet 3 has with advantage a ring-shaped flow opening 9 for gas to be introduced into the mixing chamber 4 from the secondary fluid inlet. The cylindrically shaped valve member 11 is arranged to obstruct the ring-shaped flow opening 9 so as to prevent or at least essentially prevent fluid flow through it when in closed position and allow fluid flow through the ring-shaped flow opening when in open position. The ring-shaped flow opening 9 extends about the ejector nozzle 6 and allows gas to be drawn into the mixing chamber 4 from the secondary fluid inlet 3 uniformly about the ejector nozzle when the valve member 11 is in open position.

In the illustrated embodiments, the valve arrangement 10 comprises a base member 12 supporting the valve member 11, which base member 12 is displaceably mounted on the primary fluid inlet pipe 7. As an alternative, the valve member 11 could be supported by a base member displaceably mounted on the fluid outlet pipe 8. The valve member 11 is secured to the base member 12 so as to move together with it. The base member 12 is displaceable to and fro along the associated pipe 7 so as to move the valve member 11 in the longitudinal direction of the pipe 7 to and fro between closed and open position.

In the illustrated embodiments, a support member 13 secured to the primary fluid inlet pipe 7 is arranged to support the valve member 11. The valve member 11 is arranged to slidably rest on this support member 13 via its inner surface.

In the embodiments illustrated in FIGS. 1-3, the regulating means 20 comprises a regulating element 21, preferably of bimetallic material, which is connected to the valve arrangement 10 and arranged to be influenced by the temperature of the pressurized hot gas flowing through the primary fluid inlet 2 or the temperature of the gas flowing through the fluid outlet 5 so as to control the position of the valve member 11 by changing shape in dependence upon said temperature. The regulating element 21 has with advantage the form of a bimetallic strip helically wound about the primary fluid inlet pipe 7, as illustrated in FIGS. 1-3. If the valve arrangement 10 comprises a base member mounted on the fluid outlet pipe 8, the regulating means 20 could comprise a bimetallic strip helically wound about the fluid outlet pipe 8. In the embodiments illustrated in FIGS. 1-3, the bimetallic regulating element 21 is secured between a part 22 of the valve arrangement 10 and a support member 23 fixed to the pipe 7, e.g. by being fixed to said valve arrangement part 22 at one of its ends and to said support member 23 at its other end. The bimetallic regulating element 21 is arranged directly outside the pipe 7 so as to be influenced by heat conducted through the wall of the pipe 7 from the gas flowing inside the pipe 7.

The embodiment illustrated in FIG. 3 corresponds to the embodiment illustrated in FIGS. 1 and 2 with the exception that gas in this case is diverted from the primary fluid inlet 2 into a space 24 accommodating the bimetallic regulating element 21. Hereby, a rapid response of the bimetallic regulating element 21 to temperature variations of the gas flowing through the primary fluid inlet 2 is achieved. In the embodiments according to FIGS. 1-3, the bimetallic regulating element 21 is accommodated in a space 24 located inside the base member 12 of the valve arrangement and on the exterior of the primary fluid inlet pipe 7. In the embodiment according to FIG. 3, gas from the primary fluid inlet 2 is diverted into this space 24 via holes 25 in the wall of the primary fluid inlet pipe 7. If the base member 12 of the valve arrangement and a bimetallic regulating element 21 are mounted on the fluid outlet pipe 8, the fluid outlet pipe 8 is with advantage provided with means, such as holes in the pipe wall, in order to divert gas from the fluid outlet pipe 8 into the space accommodating the bimetallic regulating element.

In the embodiments illustrated in FIGS. 1-3, the bimetallic regulating element 21 is designed to contract when subjected to increasing temperature and to expand when subjected to decreasing temperature. The bimetallic regulating element 21 is in this case designed to contract to such an extent that the valve member 11 is displaced from closed to open position when the bimetallic regulating element 21 is subjected to a temperature that increases above a predetermined level corresponding to the above-indicated limit temperature of the pressurized hot gas in the primary fluid inlet 2 and to be in such a state that the valve member 11 is kept in closed position as long as the bimetallic regulating element 21 is subjected to a temperature that is below said predetermined level. The valve member 11 is to extend beyond the flow opening 9 of the secondary fluid inlet 3 such a distance, when displaced as far as possible by the bimetallic regulating element 21 in the closing direction, that the valve member 11 is prevented from uncovering the flow opening 9 before the temperature of the pressurized hot gas in the primary fluid inlet 2 has reached the predetermined limit temperature.

In the embodiment illustrated in FIG. 4, the regulating means 20 comprises:
  a sensor 26 for sensing the temperature of the pressurized hot gas flowing through the primary fluid inlet 2;
  an electronic control unit 27 connected to the sensor 26 so as to receive signals from the sensor 26 representing said temperature; and
  a regulating member 28 connected to the control unit 27 and arranged to control the position of the valve member 11.

As an alternative, the sensor may be arranged to sense the temperature of the gas flowing through the fluid outlet 5. The control unit 27 is arranged to control the regulating member 28 and thereby the position of the valve member 11 in dependence upon the temperature sensed by the sensor 26.

In the embodiment illustrated in FIG. 4, the regulating member 28 is a reversible adjustment motor 28, which controls the position of the base member 12 of the valve arrangement and thereby the position of the valve member 11 via a rack and pinion mechanism 29.

An aircraft jet engine 30 provided with an anti-icing system is illustrated in FIG. 5. This engine 30 is provided with an air intake appliance 31 in the form of an air inlet cowl arranged to receive ambient air via an inlet 32 and to direct the air towards the engine so as to supply the engine with the required intake air. The anti-icing system comprises a conduit 33a, 33b connected to the engine, preferably to the compressor of the engine, in order to lead pressurized hot gas from the engine into the hollow leading edge 34 of the air intake cowl 31. The hollow leading edge 34 forms an annular chamber and the air intake cowl 31 is protected from icing by virtue of the heat of the pressurized hot gas introduced into this annular chamber. The anti-icing system comprises a device 1 of the type described above arranged in said conduit 33a, 33b. The primary fluid inlet 2 of the device 1 is arranged to receive pressurized hot gas from the aircraft engine via a first section 33a of said conduit and the fluid outlet 5 of the device 1 is arranged to direct gas from the mixing chamber of the device 1 towards the hollow leading edge 34 of the air intake cowl 31 via a second section 33b of said conduit.

Figure 6:
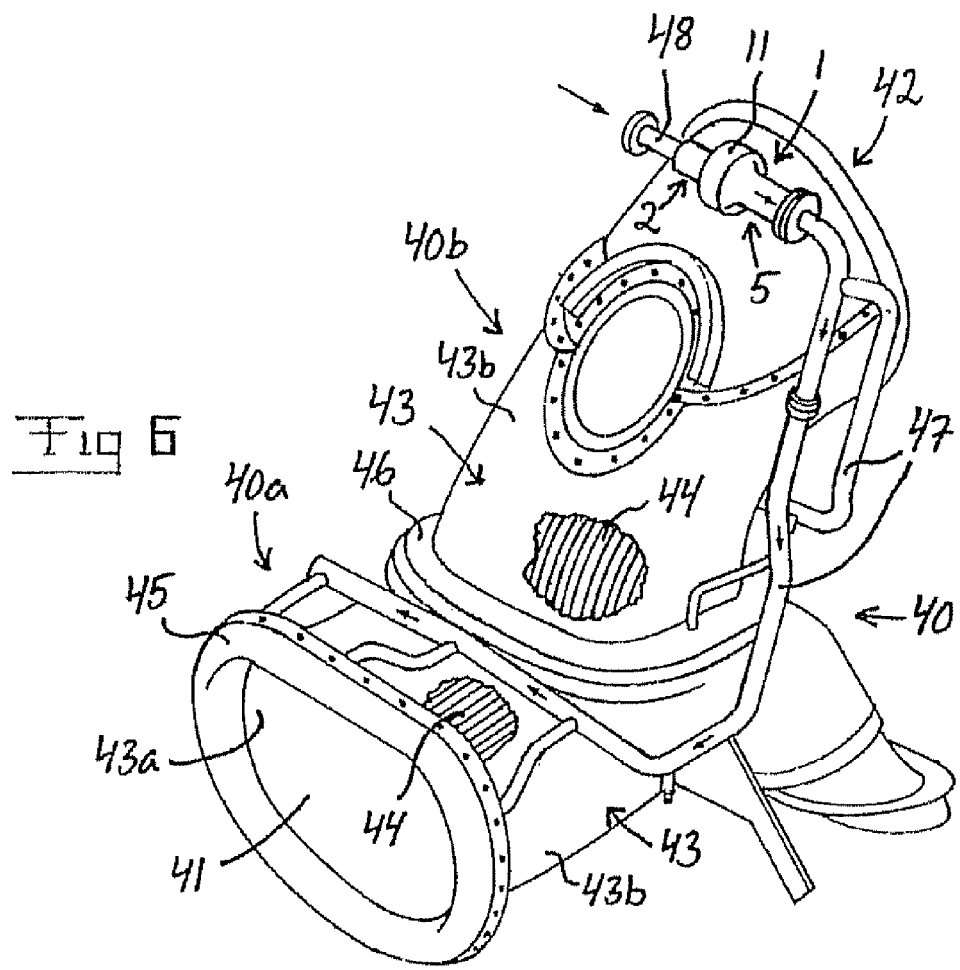
FIG. 6 is a schematical, partially cut perspective view of an air intake appliance for an aircraft propeller engine provided with an anti-icing system comprising a device according to the invention.

An air intake appliance 40 for a propeller aircraft engine is illustrated in FIG. 6. This air intake appliance 40 comprises a lower part 40a and an upper part 40b, which are secured to each other. The lower part 40a is provided with an inlet 41 for receiving ambient air. This air is guided through an air intake channel extending through the two parts 40a, 40b and leaves the air intake appliance via an outlet 42 arranged in the upper part 40b. The air intake channel is formed by a number of channel walls 43, at least some of which having an inner sheet 43a facing the air intake channel and an opposite outer sheet 43b. The lower part 40a comprises a tube-shaped channel wall 43, preferably of aluminium, provided with several ducts 44 arranged side by side for conducting pressurized hot gas between said sheets 43a, 43b of the channel wall in order to transfer heat from the pressurized hot gas to the inner sheet of the channel wall and thereby prevent formation of ice thereon. The tube-shaped channel wall 43 is also provided with a distribution pipe (not shown in FIG. 6), located behind the flange 45 that surrounds the inlet 41 of the air intake appliance, for distributing pressurized hot gas to the ducts 44. This distribution pipe is ring-shaped and extends around said inlet 41. The upper part 40b also comprises such a channel wall 43 having ducts 44 of the above-indicated type between its inner and outer sheets and a distribution pipe 46 for distributing pressurized hot gas to the ducts 44. Preferably, all the channel walls 43 of the air intake appliance are of aluminum. The outer sheet 43b of the respective channel wall 43 is shown partly cut in FIG. 6 so as to reveal some of the ducts 44 that are arranged inside the channel wall.

The above-indicated ducts 44 and distribution pipes 46 form part of an anti-icing system, which also comprises a distribution manifold 47 for supplying pressurized hot gas from an aircraft engine to the distribution pipes 46. The anti-icing system further comprises a conduit 48 to be connected to the engine, preferably to the compressor of the engine, in order to lead pressurized hot gas from the engine to the distribution manifold 47. The anti-icing system also comprises a device 1 of the type described above arranged in said conduit 48. The primary fluid inlet 2 of the device 1 is arranged to receive pressurized hot gas from the aircraft engine via said conduit 48 and the fluid outlet 5 of the device 1 is arranged to direct gas from the mixing chamber of the device 1 towards the ducts 44 in the channel walls via the distribution manifold 47 and the distribution pipes 46.

The secondary fluid inlet of the device 1 illustrated in FIGS. 5 and 6, respectively, is preferably connected to the ambient atmosphere so as to allow ambient air to be introduced into the mixing chamber of the device 1 through the secondary fluid inlet when the valve member 11 of the device 1 is in open position. Alternatively, the secondary fluid inlet may be connected to another source of gas having a lower temperature than the pressurized hot gas from the aircraft engine.

A device 1 of the inventive type may also be included in an anti-icing system for protecting another aircraft part than an air intake appliance from icing, such as for instance a wing.

The invention is of course not in any way restricted to the preferred embodiments described above; on the contrary many possibilities to modifications thereof should be apparent to a person skilled in the art without departing from the basic idea of the invention as defined in the appended claims.

The invention claimed is:

1. A device, comprising:
   a primary fluid inlet configured to be connected to a source of pressurized hot gas;
   a secondary fluid inlet arranged around an end of the primary fluid inlet, the secondary fluid inlet being configured to be connected to a source of gas having a lower temperature than a temperature of said pressurized hot gas;
   a mixing chamber connected to the primary fluid inlet and to the secondary fluid inlet so as to allow inflow of gas into the mixing chamber directly from said fluid inlets;
   a fluid outlet connected to the mixing chamber for outflow of gas from the mixing chamber;
   an ejector nozzle comprising a constriction of the primary fluid inlet arranged at the end of the primary fluid inlet, the ejector nozzle being configured to introduce gas from the primary fluid inlet into the mixing chamber, the ejector nozzle being designed to allow gas from the secondary fluid inlet to be drawn into the mixing chamber by an ejector effect caused by pressurized hot gas entering the mixing chamber from the primary fluid inlet through the ejector nozzle;
   a valve arrangement comprising a valve member surrounding a portion of the primary fluid inlet and a portion of the ejector nozzle, the valve arrangement being arranged to influence the secondary fluid inlet so as to adjust an amount of gas entering the mixing chamber from the secondary fluid inlet; and
   a temperature-dependent regulator connected to the valve arrangement, the temperature-dependent regulator being configured to control a position of the valve member and thereby the amount of gas entering the mixing chamber from the secondary fluid inlet in dependence upon the temperature of the pressurized hot gas flowing through the primary fluid inlet or the temperature of the gas flowing through the fluid outlet.

2. The device according to claim 1, wherein the valve arrangement comprises a base member supporting the valve member, and wherein said base member is displaceably mounted on a pipe forming part of the primary fluid inlet or the fluid outlet.

3. The device according to claim 1, wherein the valve member is moveable between open position, in which the valve member allows fluid flow through the secondary fluid inlet, and closed position, in which the valve member obstructs the secondary fluid inlet.

4. The device according to claim 3, wherein the regulator is arranged to keep the valve member in closed position as long as said temperature is below a predetermined limit temperature and to make the valve member assume open position when said temperature exceeds the predetermined limit temperature.

5. The device according to claim 1, wherein the valve member is cylindrically shaped and axially displaceable to and fro between a closed and an open position.

6. The device according to claim 5, wherein the cylindrically shaped valve member is coaxial with the ejector nozzle.

7. The device according to claim 5, wherein the cylindrically shaped valve member extends about the ejector nozzle.

8. The device according to claim 5, wherein the secondary fluid inlet comprises a ring-shaped flow opening for gas to be introduced into the mixing chamber from the secondary fluid inlet, and wherein the cylindrically shaped valve member is arranged to obstruct the ring-shaped flow opening when in the closed position and allow fluid flow through the ring-shaped flow opening when in the open position.

9. The device according to claim 8, wherein the ring-shaped flow opening extends about the ejector nozzle.

10. The device according to claim 1, wherein the regulator comprises a regulating element which is connected to the valve arrangement and arranged to be influenced by the temperature of the pressurized hot gas flowing through the primary fluid inlet or the temperature of the gas flowing through the fluid outlet so as to control the position of the valve member by changing shape in dependence upon said temperature.

11. The device according to claim 10, wherein the regulating element comprises bimetallic material.

12. The device according to claim 11, wherein the regulating element comprises a bimetallic strip helically wound about the primary fluid inlet or the fluid outlet.

13. The device according to claim 11, wherein the bimetallic regulating element is arranged in a space into which gas is diverted from the primary fluid inlet or the fluid outlet.

14. The device according to claim 13, wherein said space is located inside the base member.

15. The device according to claim 1, wherein the regulator comprises:
   a sensor for sensing the temperature of the pressurized hot gas flowing through the primary fluid inlet or the temperature of the gas flowing through the fluid outlet;
   a control unit connected to the sensor; and
   a regulating member connected to the control unit and arranged to control the position of the valve member;
   wherein the control unit is arranged to control the regulating member and thereby the position of the valve member in dependence upon the temperature sensed by the sensor.

16. The device according to claim 15, wherein the regulating member comprises an adjustment motor.

* * * * *